(12) United States Patent
Nozawa (10) Patent No.: US 10,498,134 B2
(45) Date of Patent: Dec. 3, 2019

(54) POWER SUPPLY SYSTEM FOR VEHICLE, AND CONTROL METHOD OF POWER SUPPLY SYSTEM

(71) Applicant: TOYOTA JIDOSHA KABUSHIKI KAISHA, Toyota-shi, Aichi-ken (JP)

(72) Inventor: Takashi Nozawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/179,240

(22) Filed: Nov. 2, 2018

(65) Prior Publication Data

US 2019/0181633 A1 Jun. 13, 2019

(30) Foreign Application Priority Data

Dec. 13, 2017 (JP) ................. 2017-238245

(51) Int. Cl.
*H02H 7/122* (2006.01)
*H02P 27/06* (2006.01)
*H02J 7/00* (2006.01)
*B60L 50/50* (2019.01)
*H02J 7/34* (2006.01)

(52) U.S. Cl.
CPC ............ *H02H 7/122* (2013.01); *B60L 50/50* (2019.02); *H02J 7/0052* (2013.01); *H02P 27/06* (2013.01); *B60L 2210/42* (2013.01); *H02J 7/345* (2013.01)

(58) Field of Classification Search
CPC ...... H02P 1/00; H02P 1/04; H02P 1/16; H02P 1/163; H02P 1/24; H02P 1/26; H02P 1/42; H02P 1/426; H02P 1/44; H02P 1/465; H02P 3/00; H02P 3/14; H02P 6/00; H02P 6/002; H02P 11/00; H02P 21/0035; H02P 23/0081; H02P 23/06; H02P 25/00; H02P 25/085; H02P 27/00; H02P 27/04; H02P 27/06; H02P 27/14; H02P 29/00; H02P 29/0088; G05B 5/00; G05D 23/00
USPC .......... 318/400.01, 700, 701, 727, 800, 801, 318/430, 471, 472; 363/40, 44, 95, 120, 363/174, 175
See application file for complete search history.

(56) References Cited

U.S. PATENT DOCUMENTS 7,595,597 B2* 9/2009 King .................. B60K 6/28 318/139
8,154,149 B2* 4/2012 King .................. B60L 50/51 307/9.1

FOREIGN PATENT DOCUMENTS

JP 2017-085869 A 5/2017

* cited by examiner

*Primary Examiner* — Antony M Paul
(74) *Attorney, Agent, or Firm* — Oliff PLC (57) ABSTRACT

A power supply system for a vehicle includes a main power supply, an electric power converter including a capacitor, a relay, a sub power supply, a bidirectional converter, and a controller. The controller is configured to cause the sub power supply and the bidirectional converter to precharge the capacitor when a main switch of the vehicle is turned on, such that the sub power supply and the bidirectional converter to precharge the capacitor before the relay is closed to connect the electric power converter to the main power supply. When the temperature of the bidirectional converter is higher a specified temperature threshold and the main switch is turned off, the controller is configured to retain the relay in a closed state for a specified time and then open the relay to separate the electric power converter from the main power supply.

4 Claims, 4 Drawing Sheets

FIG. 1

POWER SUPPLY SYSTEM FOR VEHICLE, AND CONTROL METHOD OF POWER SUPPLY SYSTEM

INCORPORATION BY REFERENCE

The disclosure of Japanese Patent Application No. 2017-238245 filed on Dec. 13, 2017 including the specification, drawings and abstract is incorporated herein by reference in its entirety.

BACKGROUND

1. Technical Field

The present specification discloses a technique relating to a power supply system mounted on a vehicle, and a control method of the power supply system. The present specification particularly relates to a power supply system mounted on an electric vehicle to supply drive electric power to a traveling motor. In the present specification, the term "electric vehicle" includes a hybrid vehicle including both a motor and an engine, and a vehicle having a fuel cell as a power supply.

2. Description of Related Art

Electric vehicles are mounted with a power supply system that supplies drive electric power to a traveling motor. For example, such a power supply system is disclosed in Japanese Patent Application Publication No. 2017-085869 (JP 2017-085869 A). The power supply system includes a power supply and an electric power converter that converts the electric power of the power supply into drive electric power of the motor. Between the power supply and the electric power converter, a relay (system main relay) is provided. When a main switch of the vehicle is turned on, the system main relay is closed to connect the electric power converter to the power supply. When the main switch of the vehicle is turned off, the system main relay is released to disconnect the electric power converter from the power supply.

Meanwhile, the electric power converter includes a capacitor that smooths an electric current (voltage) supplied from the power supply. Since an output of the power supply for driving the motor is large, a large-capacity capacitor is adopted for smoothing. When the system main relay is closed to connect the electric power converter to the power supply while the electric power remaining in the capacitor is small, a large electric current (surge current) flows into the capacitor. As a result, a load is applied to the capacitor, the system main relay, or electrical components electrically connected to the capacitor.

Accordingly, in the power supply system of JP 2017-085869 A, the capacitor is charged before the system main relay is closed. Charging of the capacitor performed before charging of the system main relay is referred to as "precharging" in the present specification. Closing the system main relay after the capacitor is charged with a moderate amount of electric power alleviates a surge current flowing into the capacitor from the power supply. The system main relay is typically switched from an opened state to a closed state when the main switch of the vehicle is turned on.

In the power supply system of JP 2017-085869 A, the capacitor is precharged using a sub power supply and a bidirectional converter. The sub power supply is a power supply provided for the electric appliances having drive voltages lower than the drive voltage of the traveling motor. The bidirectional converter is a converter having a boosting function for boosting a voltage applied to a low voltage end and outputting the boosted voltage from a high voltage end, and a voltage step-down function for stepping down a voltage applied to the high voltage end and outputting the stepped-down voltage from the low voltage end. The low voltage end of the bidirectional converter is connected to the sub power supply. The high voltage end of the bidirectional converter is connected between the system main relay and the electric power converter. The bidirectional converter boosts the voltage of the sub power supply to precharge the capacitor. During traveling, the bidirectional converter steps down the voltage of the main power supply to charge the sub power supply.

SUMMARY

As described before, during traveling, the bidirectional converter steps down the voltage of the main power supply and supplies the stepped-down voltage to the sub power supply. Hence, the temperature of the bidirectional converter may increase during traveling. When the bidirectional converter is overheated, driving of the bidirectional converter may be prohibited in order to protect components from heat. Alternatively, when a cooler that cools the bidirectional converter is provided, and the main switch of the vehicle is turned off while the temperature of the bidirectional converter is high, the cooler is stopped. For a while after the cooler is stopped, the bidirectional converter is retained in a high temperature state. When the main switch of the vehicle is turned on while the temperature of the bidirectional converter is high, starting up the bidirectional converter may be prohibited for a while in order to protect the bidirectional converter from heat. In that case, precharging is not executable for a while after the main switch is turned on, and therefore the system main relay cannot be closed. That is, a time lag may be generated before the vehicle is put in a travelable state after the main switch is turned on. An aspect of the present disclosure avoids generation of a time lag before the vehicle is in the travelable state, when the main switch is turned on while the temperature of the bidirectional converter is high.

A first aspect of the present disclosure relates to a power supply system for a vehicle. The power supply system includes: a main power supply; a motor; an electric power converter including a capacitor connected between a positive electrode of the main power supply and a negative electrode of the main power supply, the electric power converter being configured to convert output electric power of the main power supply to drive electric power of the motor; a relay configured to switch connection and disconnection between the electric power converter and the main power supply; a sub power supply having an output voltage lower than an output voltage of the main power supply; a bidirectional converter including a low voltage end connected to the sub power supply and a high voltage end connected to the capacitor, the bidirectional converter being configured to boost a voltage applied to the low voltage end and output the boosted voltage from the high voltage end, and configured to step down a voltage applied to the high voltage end and output the stepped-down voltage from the low voltage end; and a controller configured to cause the sub power supply and the bidirectional converter to precharge the capacitor when a main switch of a vehicle is turned on, such that the sub power supply and the bidirectional converter to precharge the capacitor before the relay is closed to connect the electric power converter to the main power supply. The controller is configured to retain the relay in a closed state for a specified time and then open the relay to separate the electric power converter from the main power supply when both a condition i) and a condition ii) are satisfied,. The condition i) is a condition in which the main switch is turned off, and the condition ii) is a condition in which a temperature of the bidirectional converter is higher than a specified temperature threshold.

With this configuration, in the case where the temperature of the bidirectional converter is high when the main switch is turned off, the relay is retained in a closed state. More specifically, the capacitor retains a high voltage state. When the main switch is switched to an ON state while the relay is retained in the closed state, the vehicle is immediately put in a travelable state without the necessity of precharging the capacitor. In the case where the temperature of the bidirectional converter is high when the main switch is turned off, the relay is released after the lapse of a specified time. By the time that the relay is released, the temperature of the bidirectional converter is low, so that precharging can immediately be executed when the main switch is turned on. Therefore, a time lag caused by a delay in the start of precharging is not generated before the vehicle is put in the travelable state after the main switch is turned on.

In the power supply system, the controller may be configured to output a signal notifying abnormality of the bidirectional converter when the condition ii) is satisfied. With this configuration, whenever the main switch of the vehicle is turned off, abnormality of the bidirectional converter is detectable.

In the power supply system, the controller may be configured to retain the relay in the closed state until the temperature of the bidirectional converter becomes less than the temperature threshold and then open the relay to separate the electric power converter from the main power supply when both the condition i) and the condition ii) are satisfied. With this configuration, when the relay is opened, the temperature of the bidirectional converter reliably decreases. Accordingly, even when the main switch is switched to an ON state immediately after the relay is opened, precharging can immediately be started.

A second aspect of the present disclosure relates to a control method of a power supply system. The power supply system includes: a main power supply; a motor; an electric power converter including a capacitor connected between a positive electrode of the main power supply and a negative electrode of the main power supply, the electric power converter being configured to convert output electric power of the main power supply to drive electric power of the motor; a relay configured to switch connection and disconnection between the electric power converter and the main power supply; a sub power supply having an output voltage lower than an output voltage of the main power supply; a bidirectional converter including a low voltage end connected to the sub power supply and a high voltage end connected to the capacitor, the bidirectional converter being configured to boost a voltage applied to the low voltage end and output the boosted voltage from the high voltage end, and configured to step down a voltage applied to the high voltage end and output the stepped-down voltage from the low voltage end; and a controller configured to cause the sub power supply and the bidirectional converter to precharge the capacitor when a main switch of the vehicle is turned on, such that the sub power supply and the bidirectional converter to precharge the capacitor before the relay is closed to connect the electric power converter to the main power supply. The control method includes, retaining, by the controller, the relay in a closed state for a specified time and then opening the relay to separate the electric power converter from the main power supply when both a condition i) and a condition ii) are satisfied. The condition i) is a condition in which the main switch is turned off, and the condition ii) is a condition in which a temperature of the bidirectional converter exceeds a specified temperature threshold.

With this configuration, in the case where the temperature of the bidirectional converter is high when the main switch is turned off, the relay is retained in a closed state. More specifically, the capacitor retains a high voltage state. When the main switch is switched to an ON state while the relay is retained in the closed state, the vehicle is immediately put in a travelable state without the necessity of precharging the capacitor. In the case where the temperature of the bidirectional converter is high when the main switch is turned off, the relay is released after the lapse of a specified time. By the time that the relay is released, the temperature of the bidirectional converter is low, so that precharging can immediately be executed when the main switch is turned on. Therefore, a time lag caused by a delay in the start of precharging does not occur before the vehicle is put in the travelable state after the main switch is turned on.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
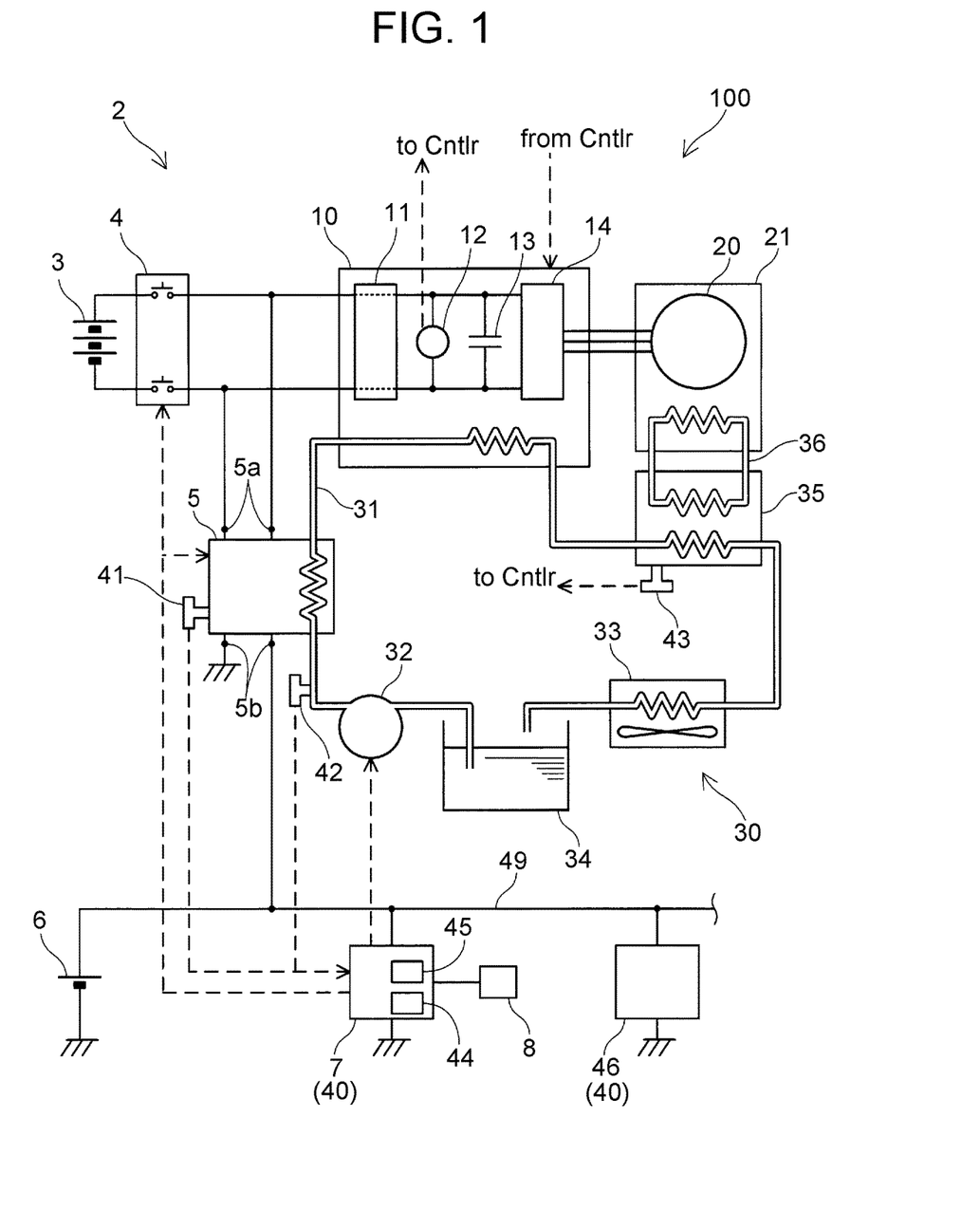
FIG. 1 is a block diagram of an electric power system of an electric vehicle including a power supply system of an embodiment.

A power supply system 2 of an embodiment will be described with reference to the drawings. The power supply system 2 of the embodiment is mounted on an electric vehicle 100. FIG. 1 illustrates a block diagram of an electric power system of the electric vehicle 100 including the power supply system 2. In FIG. 1, broken arrow lines represent signal lines. A character string "to Cntlr" means "to a controller 7 (to Controller)". A character string "from Cntlr" means "from the controller 7 (from Controller)". Solid lines connecting devices represent transfer routes of electric power. The electric vehicle 100 of the embodiment includes the power supply system 2, a traveling motor 20, and a main switch 8. The electric vehicle 100 travels with the motor 20.

The power supply system 2 includes a main battery 3, a system main relay 4, a sub-battery 6, an electric power converter 10, a bidirectional converter 5, the controller 7, and a cooler 30. The power supply system 2 supplies drive electric power to the motor 20, while supplying electric power to auxiliary machines, such as a car navigation 46. Here, the term "auxiliary machines" is a general term of electric appliances that operate at voltages lower than that of the drive voltage of the motor 20. The controller 7 of the power supply system 2 is also one of the auxiliary machines.

The vehicle is mounted with various auxiliary machines besides the devices illustrated in FIG. 1. In the following description, devices such as the controller 7 and the car navigation 46 may collectively be referred to as auxiliary machines 40.

The drive voltage of the motor 20 is, for example, 200 volts to 600 volts, and the drive electric power of the auxiliary machine 40 is 12 volts, for example. The output voltage of the main battery 3 is, for example, 200 volts. The output voltage of the sub-battery 6 is equal to the drive voltage (12 volts) of the auxiliary machines 40. An auxiliary machine electric power line 49 is spread all over the body of the electric vehicle 100. The auxiliary machine electric power line 49 is connected to the controller 7, the car navigation 46, as well as to various unillustrated auxiliary machines and the sub-battery 6. The negative electrodes of the auxiliary machines 40 and the negative electrode of the sub-battery 6 are connected through the ground.

The electric power converter 10 converts the electric power of the main battery 3 into drive electric power of the motor 20. The electric power converter 10 includes a voltage converter 11, an inverter 14, a smoothing capacitor 13, and a voltage sensor 12. The voltage converter 11 boosts the output voltage of the main battery 3 to the drive voltage of the motor 20. The inverter 14 converts a boosted direct-current electric power into an alternating-current electric power of a frequency suitable for driving of the motor 20. The direct-current electric power of the main battery 3 is boosted with the electric power converter 10. The direct-current electric power is further converted into alternating-current electric power and is supplied to the motor 20.

The smoothing capacitor 13 is connected in parallel between the voltage converter 11 and the inverter 14. The smoothing capacitor 13 suppresses pulsation of the electric current flowing between the voltage converter 11 and the inverter 14. An input terminal and an output terminal of the voltage converter 11 are electrically connected on a constant basis, and the smoothing capacitor 13 is connected between the positive electrode and the negative electrode of the main battery 3. In FIG. 1, illustration of the circuit configuration of the voltage converter 11 and the inverter 14 is omitted. Dotted lines in a square representing the voltage converter 11 schematically illustrate constant electric connection between the input terminal and the output terminal of the voltage converter 11.

The system main relay 4 is connected between the main battery 3 and the electric power converter 10. The system main relay 4 is a switch for switching connection and disconnection between the main battery 3 and the electric power converter 10. The system main relay 4 is controlled by the controller 7. While the system main relay 4 is closed to connect the electric power converter 10 with the main battery 3, the smoothing capacitor 13 is charged by the main battery 3.

The electric power converter 10 also includes the voltage sensor 12. The voltage sensor 12 measures the voltage of the smoothing capacitor 13. The measured voltage is sent to the controller 7.

The bidirectional converter 5 has a high voltage end 5a that is connected to the electric power converter 10 side of the system main relay 4. In other words, the high voltage end 5a of the bidirectional converter 5 is connected with the smoothing capacitor 13 without using the system main relay 4. Therefore, the high voltage end 5a of the bidirectional converter 5 is constantly connected with the smoothing capacitor 13. The bidirectional converter 5 has a low voltage end 5b that is connected with the sub-battery 6 through the auxiliary machine electric power line 49. The bidirectional converter 5 has a boosting function for boosting a voltage applied to the low voltage end 5b and outputting the boosted voltage from the high voltage end 5a, and a voltage step-down function for stepping down a voltage applied to the high voltage end 5a and outputting the stepped-down voltage from the low voltage end 5b. Specifically, the bidirectional converter 5 steps down the voltage of the main battery 3 and supplies the stepped-down voltage to the sub-battery 6. The bidirectional converter 5 also boosts the voltage of the sub-battery 6, and supplies the boosted voltage to the smoothing capacitor 13. In other words, the smoothing capacitor 13 is charged by the sub-battery 6 and the bidirectional converter 5. The sub-battery 6 is charged by the main battery 3.

A description will be given of the cooler 30 of the power supply system 2. The cooler 30 cools the bidirectional converter 5, the electric power converter 10, and an oil cooler 35. The cooler 30 includes a coolant circulation path 31, a pump 32, a radiator 33, and a reserve tank 34. The coolant circulation path 31 extends through the bidirectional converter 5, the electric power converter 10, the oil cooler 35, and the radiator 33 to cool the respective devices. The coolant flowing through the coolant circulation path 31 is liquid, which is typically water.

The oil cooler 35 is a device that cools a coolant oil that cools the motor 20. The coolant oil flows through an oil circulation path 36. The oil circulation path 36 extends through a motor housing 21 that houses the motor 20, and the oil cooler 35 to circulate the coolant oil therebetween. The coolant oil absorbs the heat of the motor 20 inside the motor housing 21, which increases the temperature of the coolant oil. The coolant oil having an increased temperature is cooled in the oil cooler 35 by the coolant flowing through the coolant circulation path 31 of the cooler 30. The coolant oil cooled in the oil cooler 35 flows again to the motor housing 21, and cools the motor 20.

The coolant circulation path 31 extends from the reserve tank 34 to the bidirectional converter 5, the electric power converter 10, the oil cooler 35, and the radiator 33 in this order, and returns to the reserve tank 34 again. The coolant circulation path 31 makes the coolant flow in the aforementioned order, and makes the coolant return to the reserve tank 34. The coolant is pumped with the pump 32. The pump 32 is controlled by the controller 7.

The cooler 30 includes temperature sensors 41, 42, 43. The temperature sensor 41 measures the temperature of the bidirectional converter 5. More specifically, the temperature sensor 41 measures the temperature of heat-generating components in the bidirectional converter 5. The heat-generating components typically include a power transistor, a coil, and the like for electric power conversion. The temperature sensor 42 measures the temperature of the coolant coming out of the pump 32. The temperature sensor 43 measures the temperature of the oil cooler 35. The measurement values of the temperature sensors 41, 42, 43 are sent to the controller 7. The controller 7 controls the pump 32 based on the measurement values of the temperature sensors 41 to 43. Changing the output of the pump 32 can regulate the flow rate of the coolant flowing through the coolant circulation path 31.

The controller 7 includes a central processing unit 44 (CPU) and a memory 45. Hereinafter, the central processing unit 44 is referred to as the CPU 44 for the convenience of description. The memory 45 stores various programs. When the CPU 44 executes various kinds of programs stored in the memory 45, functions described in the programs are implemented. Precharging described below is also implemented when the CPU 44 executes a precharge program stored in the memory 45. An electric power stop process described below is also implemented when the CPU 44 executes an electric power stop program stored in the memory 45.

A description will be given of precharging. The controller 7 is connected to the main switch 8 of the vehicle. The main switch 8 is also called a power switch or an ignition switch of the vehicle. When the main switch 8 is turned on, the controller 7 closes the system main relay 4 to connect the main battery 3 to the electric power converter 10. When the main battery 3 is connected to the electric power converter 10, the electric vehicle 100 is put in a travelable state.

As described before, when the system main relay 4 is closed, the electric power converter 10 is connected to the main battery 3, and the smoothing capacitor 13 of the electric power converter 10 is in the state connected with the main battery 3. The smoothing capacitor 13 has a large capacity, and when the system main relay 4 is closed while the amount of charges remaining in the smoothing capacitor 13 is small, a surge current flows into the smoothing capacitor 13 from the main battery 3. The surge current may damage the electrical components of the electric power converter 10. Accordingly, the controller 7 charges the smoothing capacitor 13, before closing the system main relay 4 and connecting the electric power converter 10 with the main battery 3. This charging is called precharging. The precharging is achieved by the sub-battery 6 and the bidirectional converter 5. The controller 7 controls the bidirectional converter 5 to execute precharging.

Figure 2:
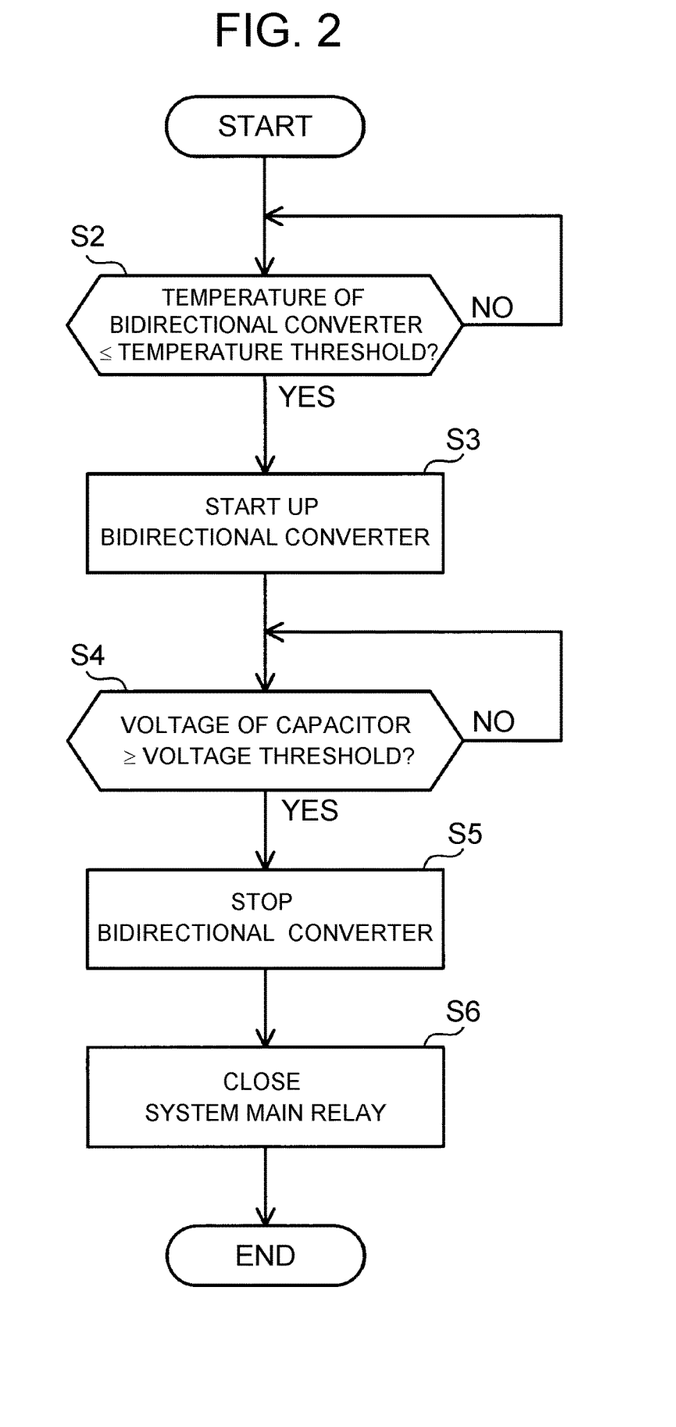
FIG. 2 is a flowchart of a precharging process executed by a controller.

FIG. 2 illustrates a flowchart of a precharging process executed by the controller 7. When the main switch 8 is turned on, the controller 7 starts the process of FIG. 2. First, the controller 7 checks the temperature (that is, a measurement value of the temperature sensor 41) of the bidirectional converter 5 (step S2). When the temperature of the bidirectional converter 5 is lower than a specified temperature threshold (step S2: YES), the controller 7 immediately starts up the bidirectional converter 5, and starts precharging (step S3). The controller 7 acquires a voltage of the smoothing capacitor 13 from the voltage sensor 12, and compares the voltage with a specified voltage threshold (step S4). The voltage threshold is set to a value close to the output voltage of the main battery 3, for example, 80% of the output voltage of the main battery 3. The controller 7 continues precharging until the voltage of the smoothing capacitor 13 exceeds the voltage threshold (step S4: NO). When the voltage of the smoothing capacitor 13 exceeds the voltage threshold (step S4: YES), the controller 7 stops the bidirectional converter 5 and ends precharging (step S5). Finally, the controller 7 closes the system main relay 4 to connect the main battery 3 to the electric power converter 10 (step S6). Since the smoothing capacitor 13 is charged up to 80% of the output voltage of the main battery 3 when the main battery 3 is connected to the electric power converter 10, a large current surge does not arise.

The temperature threshold is set such that if the temperature of the bidirectional converter 5 exceeds the temperature threshold, the components of the bidirectional converter 5 may be damaged due to a heat load. Assume the case where the temperature of the bidirectional converter 5 is higher than the temperature threshold when precharging is started. In this case, starting up the bidirectional converter 5 further increases the temperature of the bidirectional converter 5. When the temperature of the bidirectional converter 5 further increases, the components of the bidirectional converter 5 may be damaged. Hence, when the temperature of the bidirectional converter 5 exceeds the specified temperature threshold, the controller 7 waits until the bidirectional converter 5 is cooled down in order to protect the bidirectional converter 5 from heat (step S2: NO). The temperature of the bidirectional converter 5 is the temperature of the heat-generating components included in the circuit of the bidirectional converter 5, the temperature being, for example, the temperature of a power transistor and a reactor for electric power conversion.

The situation where the temperature of the bidirectional converter 5 is high when the main switch 8 of the vehicle is turned on occurs as described below. The sub-battery 6 of the power supply system 2 supplies electric power to the various auxiliary machines 40 during traveling. When the remaining electric power of the sub-battery 6 decreases, the controller 7 of the power supply system 2 starts up the bidirectional converter 5, and charges the sub-battery 6 with the electric power of the main battery 3. When the bidirectional converter 5 operates, heat is generated. The controller 7 controls the flow rate of the coolant in the cooler 30 to prevent the bidirectional converter 5 and other devices (the electric power converter 10 and the oil cooler 35) from overheating. However, when the main switch 8 of the vehicle is turned off, the cooler 30 stops. As a result, the situation where the bidirectional converter 5 is not sufficiently cooled may occur. When the main switch of the vehicle is turned off, and soon after that, the main switch 8 is switched to an ON state again, the process in the flowchart of FIG. 2 is started while the temperature of the bidirectional converter 5 is high.

If the controller 7 waits for the bidirectional converter 5 to be cooled down before starting precharging, a time lag is generated before the electric vehicle 100 is put in a travelable state. To cope with this situation, when the main switch 8 of the vehicle is turned off, the controller 7 of the power supply system 2 retains the system main relay 4 in a closed state for a while until the bidirectional converter 5 is cooled down. When the system main relay is turned off and then switched to an ON state again immediately thereafter, the system main relay is retained in the ON state, which makes precharging unnecessary. Therefore, the electric vehicle 100 is immediately put in a travelable state. When the main switch 8 is turned off, the controller 7 also waits for a while until the system main relay is opened. While the controller 7 is waiting, the temperature of the bidirectional converter 5 decreases. Even when the main switch 8 is turned on immediately after the system main relay is opened, the temperature of the bidirectional converter 5 decreases. As a result, precharging can be started immediately.

Figure 3:
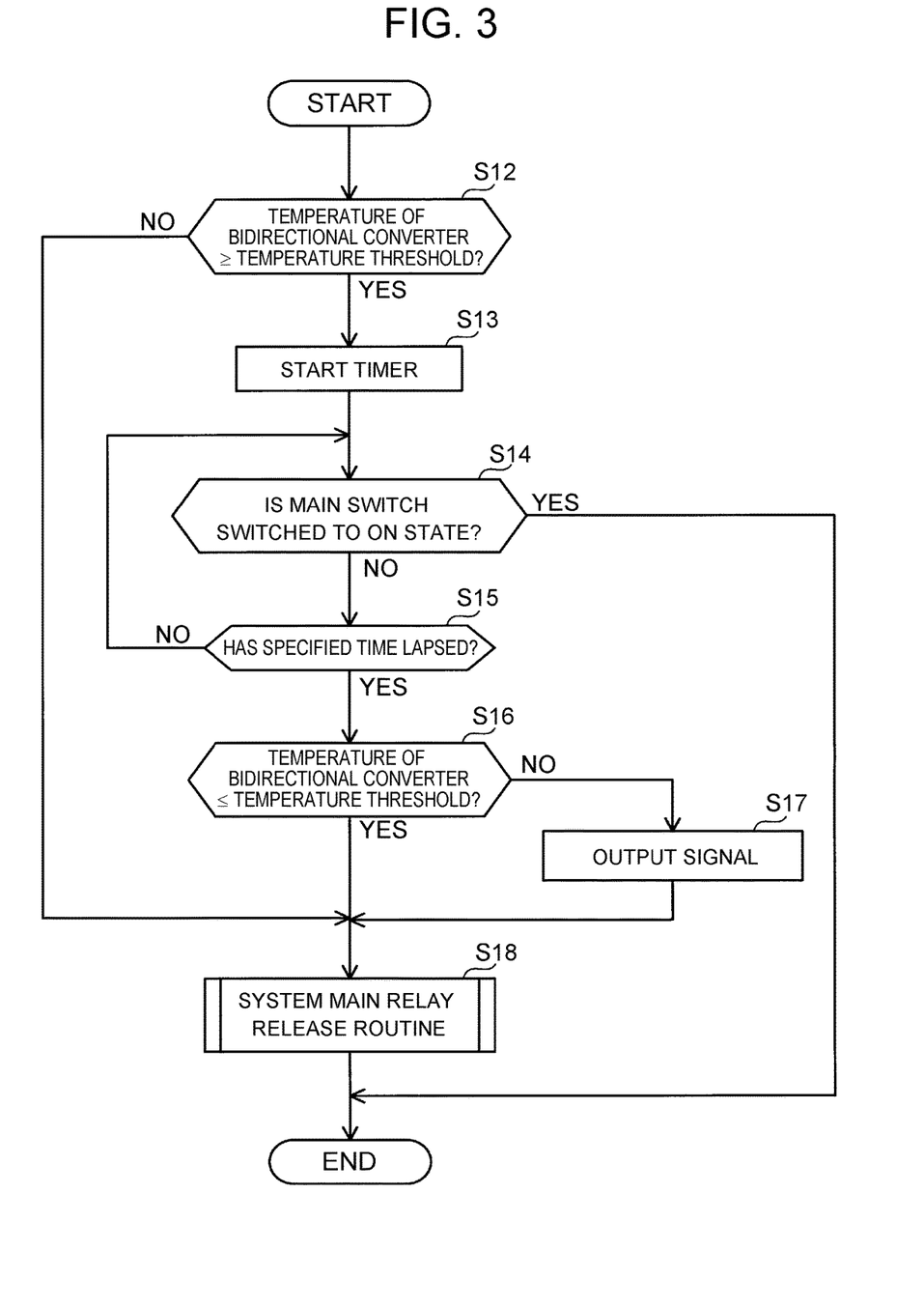
FIG. 3 is a flowchart of an electric power stop process executed by the controller.

FIG. 3 illustrates a flowchart of an electric power stop process when the main switch 8 is turned off. The program corresponding to the process of FIG. 3 is also stored in the memory 45 of the controller 7. When the main switch 8 is turned off, the CPU 44 of the controller 7 loads an electric power stop program stored in the memory 45, and starts the process of FIG. 3.

When the main switch 8 is turned off, the controller 7 first checks the temperature of the bidirectional converter 5 (step S12). When the temperature of the bidirectional converter 5 is lower than a specified temperature threshold (step S12: NO), the controller 7 immediately shifts to a release routine (step S18) of the system main relay 4.

The release routine of the system main relay 4 will be described briefly. The controller 7 controls the inverter 14 such that a current flows to the coil, without rotation of the motor 20. Accordingly, the coil of the motor 20 consumes electrical energy of the capacitor 13, with the result that the capacitor 13 is discharged. Once the voltage of the capacitor 13 becomes less than a specified safety voltage, the controller 7 stops the inverter 14. Finally, the controller 7 releases the system main relay 4 to separate the electric power converter 10 from the main battery 3. An unexpected fault current can be prevented by separating the electric power converter 10 from the main battery 3.

Refer back to the description of the electric power stop process. In step S12, when the temperature of the bidirectional converter 5 exceeds the temperature threshold, the controller 7 starts a timer, and waits for the lapse of a specified time (step S13, step S15). When the main switch 8 is switched to an ON state while the controller 7 is waiting for the lapse of a specified time, the controller 7 immediately ends the process of FIG. 3 (step S14: YES). When the main switch 8 is switched to an ON state while the controller 7 is waiting for the specified time, the system main relay 4 is retained in the closed state without discharging of the capacitor 13. Hence, the vehicle can immediately shift to a travelable state.

The specified time in step S15 is set to a time that is long enough for the temperature of the bidirectional converter 5 to become less than the temperature threshold. After the lapse of the specified time, the controller 7 compares the temperature of the bidirectional converter 5 with the temperature threshold again (step S15: YES, S16). In step S16, when the temperature of the bidirectional converter 5 is not less than the temperature threshold, there is a high possibility of the occurrence of some abnormality (step S16: NO). In that case, the controller 7 outputs a signal (data) notifying the occurrence of the abnormality in the bidirectional converter 5 (step S17), and shifts to the release routine of the system main relay 4 (step S18). The signal (abnormality occurrence signal) indicative of the occurrence of abnormality in the bidirectional converter 5 is output to an instrument panel or a diagnosis memory, for example. The instrument panel, which received the abnormality occurrence signal, turns on an alarm lamp. The diagnosis memory, which received the abnormality occurrence signal, stores a message indicative of the occurrence of the abnormality in the bidirectional converter 5. A serving staff sees data in the diagnosis memory at the time of maintenance inspection of the vehicle.

When the temperature of the bidirectional converter 5 becomes less than the temperature threshold after the lapse of a specified time, the controller 7 executes a system main relay release routine, and ends the process of FIG. 3 (step S16: YES, S18).

Executing the process of FIG. 3 ensures that the temperature of the bidirectional converter 5 is less than the temperature threshold when the main switch 8 is turned on next time, which allows immediate execution of precharging. The process of FIG. 3 prevents generation of a time lag caused by a delay in the start of precharging before the vehicle is put in the travelable state after the main switch 8 is turned on.

The process of steps S16 and S17 enables the power supply system 2 to check whether abnormality occurs in the bidirectional converter 5 whenever the stop process is executed.

Figure 4:
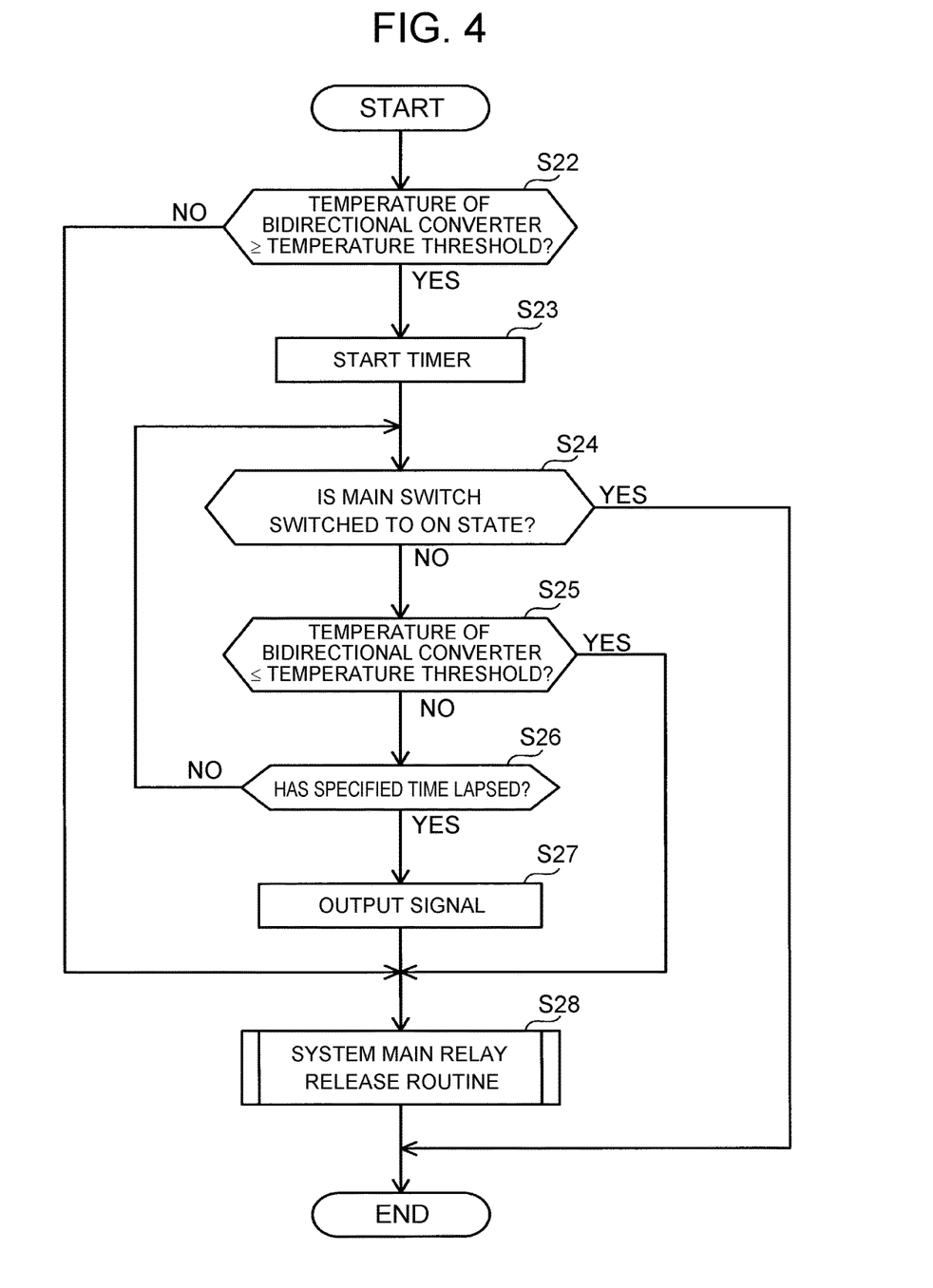
FIG. 4 is a flowchart of an electric power stop process in a modification.

FIG. 4 illustrates a flowchart of an electric power stop process in a modification. In the modification, in the case where the temperature of the bidirectional converter 5 is higher than a temperature threshold when the main switch 8 is turned off, the controller 7 waits until the temperature becomes less than the temperature threshold. The steps of FIG. 4 will be described below.

When the main switch 8 is turned off, the controller 7 compares the temperature of the bidirectional converter 5 with the temperature threshold (step S22). When the temperature of the bidirectional converter 5 is less than the temperature threshold, the controller 7 immediately executes the release routine of the system main relay (step S22: NO, S28).

When the temperature of the bidirectional converter 5 exceeds the temperature threshold (step S22: YES), the controller 7 starts a timer (step S23). The controller 7 then waits until the temperature of the bidirectional converter 5 becomes less than the temperature threshold (steps S25, S26, S24). When the temperature of the bidirectional converter 5 becomes less than the temperature threshold, the controller 7 shifts to the release routine of the system main relay 4 (step S25: YES, S28).

When the main switch 8 is switched to an ON state during a loop of steps S24 to S26, the controller 7 immediately stops the process of FIG. 4 (step S24: YES). In this case, since the system main relay 4 is kept closed, the vehicle can immediately shift to a travelable state.

When the temperature of the bidirectional converter 5 does not decrease to the temperature threshold even after the lapse of a specified time, the controller 7 determines that some abnormality occurs, outputs a signal indicative of the occurrence of the abnormality, and shifts to the system main relay release routine (step S26: YES, S27, S28).

In the electric power stop process in the modification (FIG. 4), a time lag is not generated before the vehicle is put in a travelable state when the main switch 8 is turned on next time.

The important points about the technique of the embodiment will be described. The temperature of a cooling object of the cooler 30 may be used as an approximate value of the temperature of the bidirectional converter 5. For example, as illustrated in FIG. 1, the cooler 30 includes the temperature sensor 43 that measures the temperature of the oil cooler 35, and the temperature sensor 42 that measures the temperature of the coolant. The temperature of the oil cooler 35 measured by the temperature sensor 43 or the temperature of the coolant measured by the temperature sensor 42 may be used as an approximate value of the temperature of the bidirectional converter 5.

The main battery 3 of the embodiment is one example of a main power supply. The main power supply may be a fuel cell. The sub-battery 6 of the embodiment is one example of a sub power supply. The sub power supply may be a step-down converter that steps down the electric power of the main battery 3.

Although specific examples of the present disclosure have been described in detail in the foregoing, they are merely illustrative and are not intended to restrict the claims of the disclosure. The technique described in the claims includes various modifications and deformations of the specific examples illustrated in the foregoing. The technological components described in the present specification or in the drawings demonstrate technical usefulness independently or in various kinds of combinations, and are not limited to the combinations described in the claims at the time of filing application. The technique illustrated in the present specification or in the drawings can concurrently achieve a plurality of objects. Accomplishing one of the objects itself provides the technical usefulness thereof.

What is claimed is:
1. A power supply system for a vehicle, the power supply system comprising:

a main power supply;

a motor;

an electric power converter including a capacitor connected between a positive electrode of the main power supply and a negative electrode of the main power supply, the electric power converter being configured to convert output electric power of the main power supply to drive electric power of the motor;

a relay configured to switch connection and disconnection between the electric power converter and the main power supply;

a sub power supply having an output voltage lower than an output voltage of the main power supply;

a bidirectional converter including a low voltage end connected to the sub power supply and a high voltage end connected to the capacitor, the bidirectional converter being configured to boost a first voltage applied to the low voltage end and output the first voltage from the high voltage end, and configured to step down a second voltage applied to the high voltage end and output the second voltage from the low voltage end; and a controller configured to cause the sub power supply and the bidirectional converter to precharge the capacitor when a main switch of the vehicle is turned on, such that the sub power supply and the bidirectional converter to precharge the capacitor before the relay is closed to connect the electric power converter to the main power supply, the controller is configured to retain the relay in a closed state for a specified time and then open the relay to separate the electric power converter from the main power supply when both a condition i) and a condition ii) are satisfied;

the condition i) being a condition in which the main switch is turned off; and the condition ii) being a condition in which a temperature of the bidirectional converter is higher than a specified temperature threshold.

2. The power supply system according to claim 1, wherein the controller is configured to output a signal notifying abnormality of the bidirectional converter when the condition ii) is satisfied.

3. The power supply system according to claim 1, wherein the controller is configured to retain the relay in the closed state until the temperature of the bidirectional converter becomes less than the temperature threshold, and then open the relay to separate the electric power converter from the main power supply when both the condition i) and the condition ii) are satisfied.

4. A control method of a power supply system, the power supply system including: a main power supply; a motor; an electric power converter including a capacitor connected between a positive electrode of the main power supply and a negative electrode of the main power supply, the electric power converter being configured to convert output electric power of the main power supply to drive electric power of the motor; a relay configured to switch connection and disconnection between the electric power converter and the main power supply; a sub power supply having an output voltage lower than an output voltage of the main power supply; a bidirectional converter including a low voltage end connected to the sub power supply and a high voltage end connected to the capacitor, the bidirectional converter being configured to boost a first voltage applied to the low voltage end and output the first voltage from the high voltage end, and configured to step down a second voltage applied to the high voltage end and output the second voltage from the low voltage end; and a controller configured to cause the sub power supply and the bidirectional converter to precharge the capacitor when a main switch of a vehicle is turned on, such that the sub power supply and the bidirectional converter to precharge the capacitor before the relay is closed to connect the electric power converter to the main power supply, the control method comprising:

retaining, by the controller, the relay in a closed state for a specified time and then opening the relay to separate the electric power converter from the main power supply when both a condition i) and a condition ii) are satisfied;

the condition i) being a condition in which the main switch is turned off; and the condition ii) being a condition in which a temperature of the bidirectional converter is higher than a specified temperature threshold.

* * * * *